United States Patent
Takada

(10) Patent No.: US 11,995,153 B2
(45) Date of Patent: May 28, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yosuke Takada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 336 days.

(21) Appl. No.: 17/412,298

(22) Filed: Aug. 26, 2021

(65) Prior Publication Data

US 2022/0092357 A1 Mar. 24, 2022

(30) Foreign Application Priority Data

Sep. 24, 2020 (JP) ................. 2020-159662

(51) Int. Cl.
| | |
|---|---|
| *G06T 7/90* | (2017.01) |
| *G06F 18/21* | (2023.01) |
| *G06F 18/214* | (2023.01) |
| *G06N 3/04* | (2023.01) |
| *G06T 3/4015* | (2024.01) |
| *G06V 10/56* | (2022.01) |

(52) U.S. Cl.
CPC .......... *G06F 18/217* (2023.01); *G06F 18/214* (2023.01); *G06N 3/04* (2013.01); *G06T 3/4015* (2013.01); *G06T 7/90* (2017.01); *G06V 10/56* (2022.01); *G06T 2207/10024* (2013.01); *G06T 2207/20081* (2013.01)

(58) Field of Classification Search
CPC ....... G06F 18/217; G06F 18/214; G06N 3/04; G06N 3/045; G06N 3/08; G06T 3/4015; G06T 7/90; G06T 2207/10024; G06T 2207/20081; G06V 10/56; G06V 10/7747; G06V 10/7792
USPC ......................................................... 382/157
See application file for complete search history.

(56) References Cited

U.S. PATENT DOCUMENTS

| | | | | |
|---|---|---|---|---|
| 2003/0088531 | A1* | 5/2003 | Nishi | G16B 40/00 706/16 |
| 2010/0042004 | A1* | 2/2010 | Dhawan | A61B 5/444 600/476 |
| 2018/0253104 | A1* | 9/2018 | Miyamoto | G05D 1/0274 |

(Continued)

FOREIGN PATENT DOCUMENTS

JP 2019-95600 A 6/2019

OTHER PUBLICATIONS

Gharbi, M. et.al, "Deep Joint Demosaicking and Denoising" ACM Transactions on Graphics (Nov. 2016) pp. 1-12. vol. 35, No. 6, Article No. 191.

*Primary Examiner* — Ali Bayat
(74) *Attorney, Agent, or Firm* — Carter, DeLuca & Farrell LLP

(57) ABSTRACT

The information processing apparatus obtains a distribution characteristic representing an attribute of a color included in an acquired first image group and determines the number of times of learning based on the distribution characteristic. The information processing apparatus generates a data set consisting of a set of the first image group and a second image group corresponding to the first image group and by using the generated data set, generates a learning model by performing learning using a network based on the determined number of times of learning.

13 Claims, 7 Drawing Sheets

(56) References Cited

U.S. PATENT DOCUMENTS

2021/0360179 A1* 11/2021 Dangi .................... H04N 25/60
2021/0374527 A1    12/2021 Takada
2022/0036536 A1*  2/2022 Baijal ................... G06F 18/214
2022/0256140 A1*  8/2022 Li ........................ H04N 19/105

* cited by examiner

| TOTAL NUMBER Na OF TIMES OF LEARNING | HUE | | NUMBER Nb OF TIMES OF LEARNING FOR EACH HUE |
|---|---|---|---|
| | NUMBER x | SECTION | |
| 100 | 1 | 0~4 | 1 |
| | 2 | 5~9 | 1 |
| | 3 | 10~14 | 2 |
| | 4 | 15~19 | 1 |
| | 5 | 20~24 | 2 |
| | ⋮ | ⋮ | ⋮ |
| | 36 | 175~179 | 10 |

FIG.5

INFORMATION PROCESSING APPARATUS, INFORMATION PROCESSING METHOD, AND STORAGE MEDIUM

BACKGROUND

Field

The present disclosure relates to generation of a learning model for machine learning and a learning method.

Description of the Related Art

In recent years, a machine learning technique is made use of in a variety of fields, such as image recognition and image processing. Among machine learning, in deep learning that needs to learn a large amount of data, in a case where the order of a learning model is not appropriate, it may happen that learning does not converge or it is not possible to exhibit original performance although learning converges. Because of this, a learning schedule indicating in which order learning is performed using a large amount of data is important.

As regards the learning schedule, Japanese Patent Laid-Open No. 2019-95600 has disclosed a technique relating to curriculum learning in which a simple task is learned first and learning is performed by gradually increasing the degree of difficulty of the task. By performing learning in the order such as this, it is known that it is possible to reach a locally optimum solution with a high accuracy and the convergence to an optimum solution is made earlier. As an application example of the curriculum learning, application examples to a variety of techniques, such as image recognition, image processing, and moving image recognition, are reported, not limited only to voice recognition.

SUMMARY

Although it is possible to perform learning efficiently with the technique of Japanese Patent Laid-Open No. 2019-95600, there is such a problem that a bias occurs in the number of times of learning. In an example of an image, in a case where there is a bias in a distribution of three color attributes (hue, saturation, luminance) in a teacher image group, there is a possibility that a bias occurs in the number of times of learning depending on color even though the curriculum learning is performed. In a case where the learning such as this is performed, there is a possibility that it is not possible to generate a learning model with high robustness. In a case where a demosaic network is learned, which is based on the convolutional neural network (CNN) described by Michael Gharbi (Michael Gharbi et. al, "Deep Joint Demosaicking and Denoising", ACM Transactions on Graphics, Vol. 35, No. 6, Article No.: 191, November 2016), on a condition that there is a bias in the due distribution of teacher image data used for learning, a bias occurs in the number of times of learning depending on hue even though the learning is performed in any order. As a result of this, there is a case where a false pattern that does not exist originally occurs at the time of demosaicking RAW image data by using a trained model. This phenomenon appears remarkably in the hue whose number of times of learning is small in the teacher image group.

Consequently, the present disclosure provides a technique to generate a learning model whose robustness is high in a case of learning a CNN-based network in an image signal processing system, such as demosaic, noise reduction, and super resolution.

The information processing apparatus according to one aspect of the present disclosure is an information processing apparatus that generates a learning model using a network and includes: an acquisition unit configured to acquire a first image group consisting of teacher images comprising plural color components; an analysis unit configured to obtain a distribution characteristic representing an attribute of a color included in the first image group; a generation unit configured to generate a data set consisting of a set of the first image group and a second image group corresponding to the first image group; a determination unit configured to determine a number of times of learning based on the distribution characteristic; and a learning unit configured to generate a learning model by performing learning using the network by using the data set based on the number of times of learning.

Further features of the present disclosure will become apparent from the taming description of exemplary embodiments with reference to the attached drawings.

BRIEF DESCRIPTION OF THE DRAWINGS

FIG. 5 is a diagram showing an example of a learning schedule;

DESCRIPTION OF THE EMBODIMENTS

Figure 1:
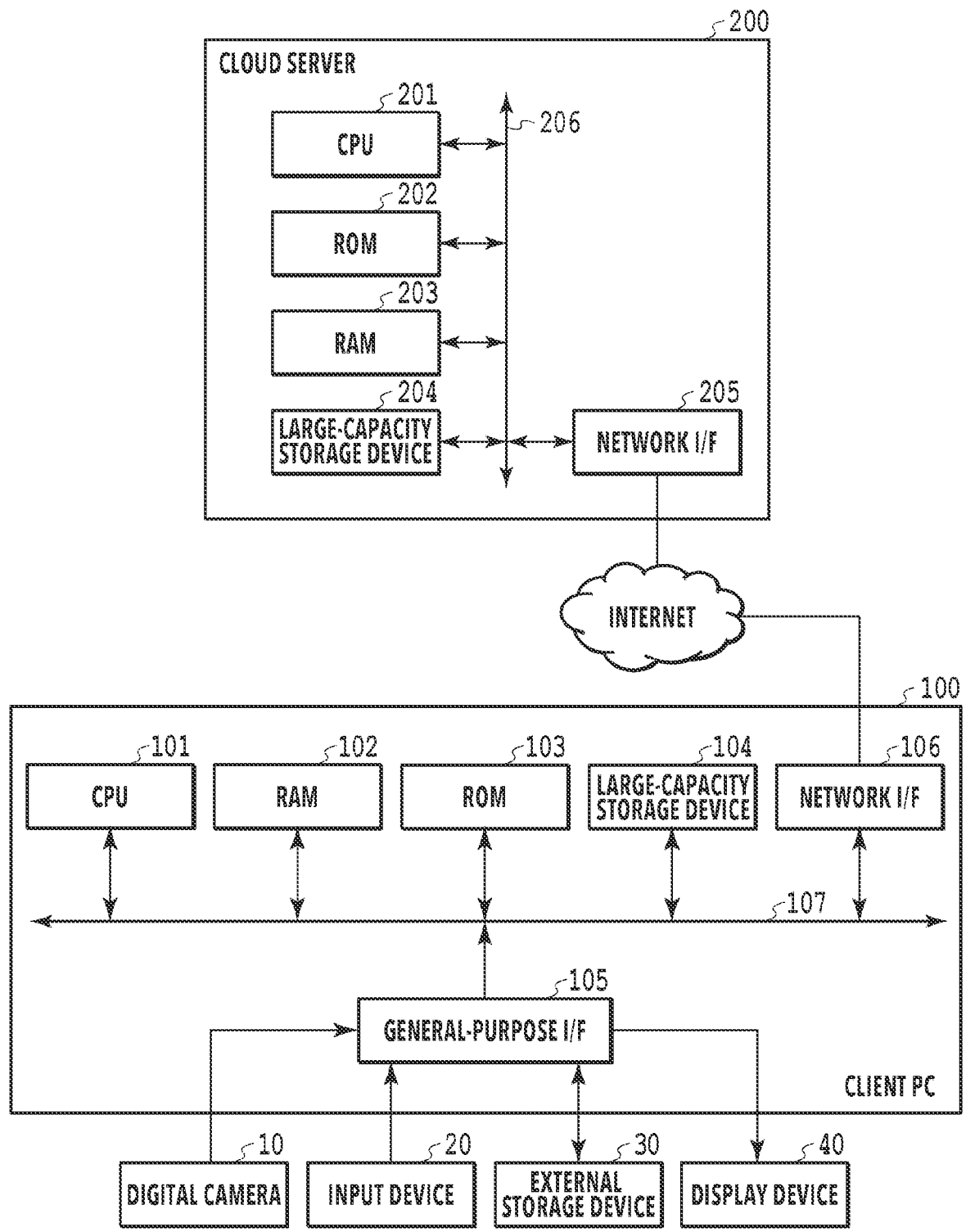
FIG. 1 is a diagram showing an example of a configuration of an information processing system.

In the following, aspects in which the technique of the present disclosure is performed are explained by using the drawings. The following embodiments are not intended to limit the technique of the present disclosure according to the scope of the claims and all combinations of features explained in the embodiments are not necessarily indispensable to the solution of the technique of the present disclosure. Explanation is given by attaching the same symbol to the same configuration.

<About CNN>

First, a convolutional neural network (CNN) used generally in the image processing technique that applies deep learning, which appears in the following embodiments, is explained. The CNN is a technique to repeat a nonlinear operation after performing convolution of a filter generated by training or learning (hereinafter, learning is used.) for image data. The filler is also called a local receptive field (LRF), The image data that is obtained by performing the nonlinear operation after convolution of the filter for the image data is called a feature map. Further, the learning is performed by using a learning model ("training data" or "data sets") including a pair of input image data and output image data. In brief, generating the value of the filter that can convert input image data into corresponding output image data with a high accuracy from the learning model is learning. Details of this will be described later.

In a case where the image data has RGB color channels or in a case where the feature map includes a plurality of pieces of image data, the filter that is used for convolution also has a plurality of channels accordingly. That is, the convolution filter is represented by a four-dimensional array including the number of channels, in addition to the vertical and horizontal sizes and the number of pieces of image data. The processing to perform the nonlinear operation after convolution of the filter for the image data (or feature map) is indicated in units of layers and the feature map and the filter are represented as, for example, the nth-layer feature map and the nth-layer filter. Further, for example, the CNN in which the filter convolution and the nonlinear operation are repeated three times has a three-layer network structure. The nonlinear operation processing such as this can be formularized as formula (1) below.

$$X_n^{(l)} = f(\Sigma_{k=1}^K W_n^{(l)} * X_{n-1}^{(l)} + b_n^{(l)}) \quad (1)$$

In formula (1), $W_n$ is an nth-layer filter, $b_n$ is an nth-layer bias, f is a nonlinear operator, $X_n$ is an nth-layer feature map, and * is a convolution operator. Here, (1) at the top right indicates that the filer or feature map is the first filter or feature map. The filter and the bias are generated by learning, to be described later, and also collectively called "network parameters". As the nonlinear operation, for example, the sigmoid function or ReLU (Rectified Linear Unit) is used. In a case of ReLU, the nonlinear operator is given by formula (2) below.

$$f(X) = \begin{cases} X & \text{if } 0 \leq X \\ 0 & \text{otherwise} \end{cases} \quad (2)$$

As shown in formula (2), among elements of an input vector X, a negative element is zero and a positive element remains the same as it is.

As the network that uses the CNN, ResNet (Residual Network) in the image recognition field and its applied RED-Net (Residual Encoder-Decoder Network) in the super resolution field are well known. Each makes an attempt to improve the accuracy of the processing by increasing the number of layers of the CNN and performing the filter convolution a number of times. For example, the ResNet is characterized by a network structure in which a path to shortcut the convolutional layers is provided and due to this, implements a multi-layer network as many as 152 layers and implements recognition of high accuracy which is close to a human recognition ratio. The reason the accuracy of the processing improves by the multi-layer CNN is simply that it is possible to represent a nonlinear relationship between input and output by repeating the nonlinear operation a number of times.

<Learning of CNN>

Next, the learning of the CNN is explained. The learning of the CNN is performed by minimizing the objective function generally expressed by formula (3) below for the learning model including a set of input learning image (observed image) data and output learning image (correct answer image) data corresponding to the input learning image data.

$$L(\theta) = \frac{1}{n} \sum_{i=1}^n \|F(X_i; \theta) - Y_i\|_2^2 \quad (3)$$

In formula (3), L is a loss function that measures an error between the correct answer and its estimation. Further, $Y_i$ is ith output learning image data and $X_i$ is ith input learning image data. Further, F is a function that collectively expresses all the operations (formula (1)) performed in each layer of the CNN. Further, θ is network parameters (filter and bias). Further, $\|Z\|_2$ is an L2 norm and in brief, the root of the sum of squares of elements of a vector Z. Further, n is the total number of all the learning models that are used for learning. Generally, the total number of all the learning models are large (for example, several tens of thousand pieces), and therefore, in the stochastic gradient descent (SCID) method, part of the learning image data is selected randomly and used for learning. Due to this, it is possible to reduce the calculation load in the learning using a large number of learning models. Further, as the object function minimization (optimization) method, a variety of methods are known, such as the momentum method, the AdaGrad method, the AdaDelta method, and the Adam method. The Adam method is given by formula (4) below.

$$g = \frac{\partial L}{\partial \theta_i^t} \quad (4)$$
$$m = \beta_1 m + (1 - \beta_1) g$$
$$v = \beta_2 v + (1 - \beta_2) g^2$$
$$\theta_i^{t+i} = \theta_i^t - \alpha \frac{\sqrt{1 - \beta_2^t}}{(1 - \beta_1)} \frac{m}{(\sqrt{v} + \in \varepsilon)}$$

In formula (4), $\theta_i^t$ is an ith network parameter in tth repetition and g is the gradient of the loss function L relating to $\theta_i^t$. Further, m and v are moment vectors, α is a base learning rate, $\beta_1$ and $\beta_2$ are hyper parameters, and ε is a small constant. No selection policy of the optimization method in learning exists, and therefore, basically any method may be used. It is known that a difference in the learning time occurs because the convergence is different for different methods.

First Embodiment

In the present embodiment, an aspect is explained in which a demosaic network (trained model) is generated by determining a schedule without bias in learning for each hue based on the analysis results of the distribution characteristic of a teacher image group, particularly, the hue distribution characteristic and performing demosaic learning in accordance with the learning schedule. The demosaic network model means, for example, the architecture and parameters (coefficients) of a multilayer CNN-based neural network. The architecture of the neural network does not necessarily have to be one based on the CNN. Note that the trained model is formed by sampling the mosaic image data (student image data) and the demosaic image data (teacher image data) in accordance with a color filter array pattern. In the above, although the mosaic image data is also called student image data, it is also possible to call the data for learning the demosaic network as teacher image data.

An aspect is explained in which a model is generated by a learning processing application determining a learning schedule that eliminates the bias in the number of times of learning for each hue from the hue distribution of a teacher image data group based on instructions from a CPU 101 and performing learning in accordance with the leaning schedule in the configuration described above.

<System Configuration>

The configuration of the information processing system according to the present embodiment is explained by using the drawings. FIG. 1 is a diagram showing an example of the configuration of the information processing system according to the present embodiment. In the information processing system shown in FIG. 1, a cloud server 200 in charge of generation of a learning model and demosaic learning and a client PC 100 in charge of demosaic inference are connected via the internet. It may also be possible to perform both the above-described learning and the above-described inference on the cloud server 200 or on the client PC 100 alone.

<Hardware Configuration of Client PC>

The client PC 100 of the present embodiment is an image processing apparatus that performs demosaic inference by applying trained neural network parameters provided from the cloud server 200 to a RAW image (mosaic image) that is input from an image capturing apparatus (digital camera). The RAW image means an image in the linear color space, which is captured by a single-chip imaging sensor to which attached a color filter corresponding to one color at one pixel position. A user obtains an image (RGB image) including three channels of RGB corresponding to plural color components by demosaicking the RAW image, which is a mosaic image, by making use of the image processing application installed in the client PC 100. The client PC 100 has the CPU 101, a RAM 102, a ROM 103, a large-capacity storage device 104, a general-purpose interface (I/F) 105, and a network I/F 106 and each component is connected to one another by a system bus 107. Further, the client PC 100 is also connected to a digital camera 10, an input device 20, an external storage device 30, and a display device 40 via the general-purpose I/F 105.

The CPU 101 executes programs stored in the ROM 103 by using the RAM 102 as a work memory and centralizedly controls each component of the client PC 100 via the system bus 107. Further, the large-capacity storage device 104 is, for example, an HDD or an SSD and stores various kinds of data that is handled in the client PC 100. The CPU 101 writes data to the large-capacity storage device 104 and reads data stored in the large-capacity storage device 104 via the system bus 107. The general-purpose 105 is a serial bus interface, for example, such as USB, IEEE 1394, and HDMI (registered trademark). The client PC 100 acquires data from the external storage device 30 (various storage media, for example, such as memory card, CF card, SD card, and USB memory) via the general-purpose I/F 105. Further, the client PC 100 receives user instructions from the input device 20, such as a mouse and a keyboard, via the general-purpose I/F 105. Further, the client PC 100 outputs image data and the like processed by the CPU 101 to the display device 40 (various image display devices, for example, such as liquid crystal display) via the general-purpose I/F 105. Further, the client PC 100 acquires data of a captured image (RAW image) that is a developing processing target from the digital camera 10, which is an image capturing apparatus, via the general-purpose I/F 105. The network I/F 106 is an interface for connecting to the internet. The client PC 100 acquires network parameters for demosaic inference by accessing the cloud server 200 by an installed web browser.

<Hardware Configuration of Cloud Server>

The cloud server 200 of the present embodiment is a server apparatus that provides a cloud service on the internet. In more detail, the cloud server 200 provides network parameters as learning results (trained model) in response to a request from the client PC 100 by generating a learning model, determining a learning schedule, and performing demosaic learning in accordance with the learning schedule. The cloud server 200 has a CPU 201, a ROM 202, a RAM 203, a large-capacity storage device 204, and a network I/F 205 and each component is connected to one another by a system bus 206. The CPU 201 controls the entire operation by reading control programs stored in the ROM 202 and performing various kinds of processing. The RAM 203 is used as a primary storage area, such as a main memory and a work area, of the CPU 201. The large-capacity storage device 204 is a large-capacity secondary storage device, such as an HDD and an SSD, which stores image data and various programs. The network I/F 205 is an interface for connecting to the internet and provides the above-described network parameters in response to a request from a web browser of the client PC 100.

Although the components of the client PC 100 and the cloud server 200 exist other than those described above, they are not the main purpose of the present disclosure, and therefore, explanation thereof is omitted. In the present embodiment, it is supposed that the generation of a learning model and a learning schedule and demosaic learning are performed by the cloud server, the network parameters, which are learning results, are downloaded to the client PC, and demosaic inference and development of a development-target RAW image are performed. Note that the above-described system configuration is an example and the system configuration is not limited to this. For example, the configuration may be one in which the function in the charge of the cloud server 200 is divided into sub-functions and the generation of a learning model, the generation of a learning schedule, and demosaic learning are performed by different apparatuses. Further, the configuration may be one in which all the generation of a learning model, the generation of a learning schedule, the demosaic learning, the demosaic inference, and the development are performed in the digital camera 10 comprising both the function of the client PC 100 and the function of the cloud server 200. Further, it may also be possible for the cloud server 200 to have the GPU as a configuration. In that case, the GPU performs demosaic learning by receiving instructions of the CPU 201 and copying the learning model (teacher image and student image) stored in the RAM 203 in a memory (for example, VRAM) on the GPU.

<Flow of Processing of Entire System>

Figure 2:
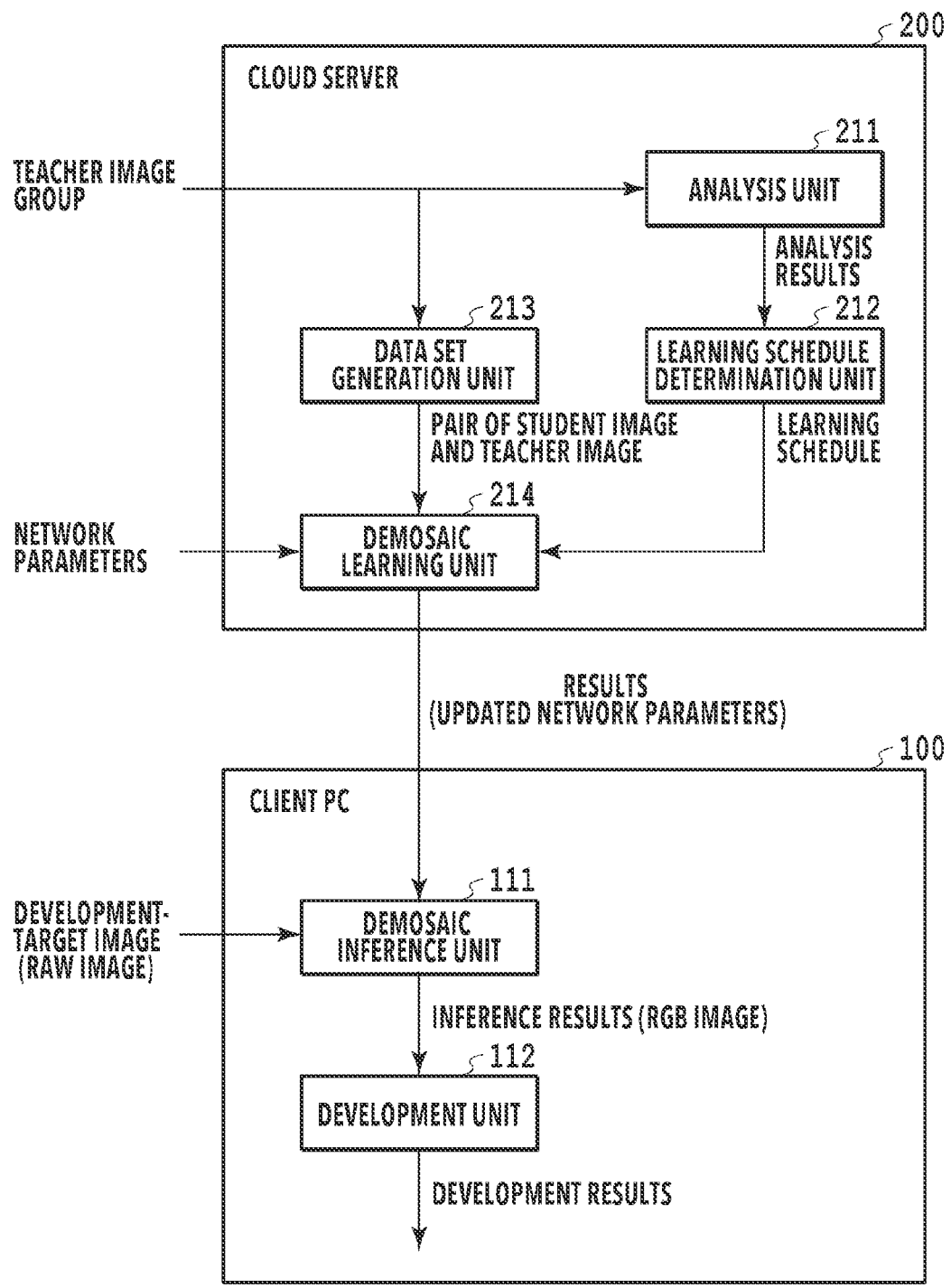
FIG. 2 is a function block diagram of the entire information processing system.
Figure 3:
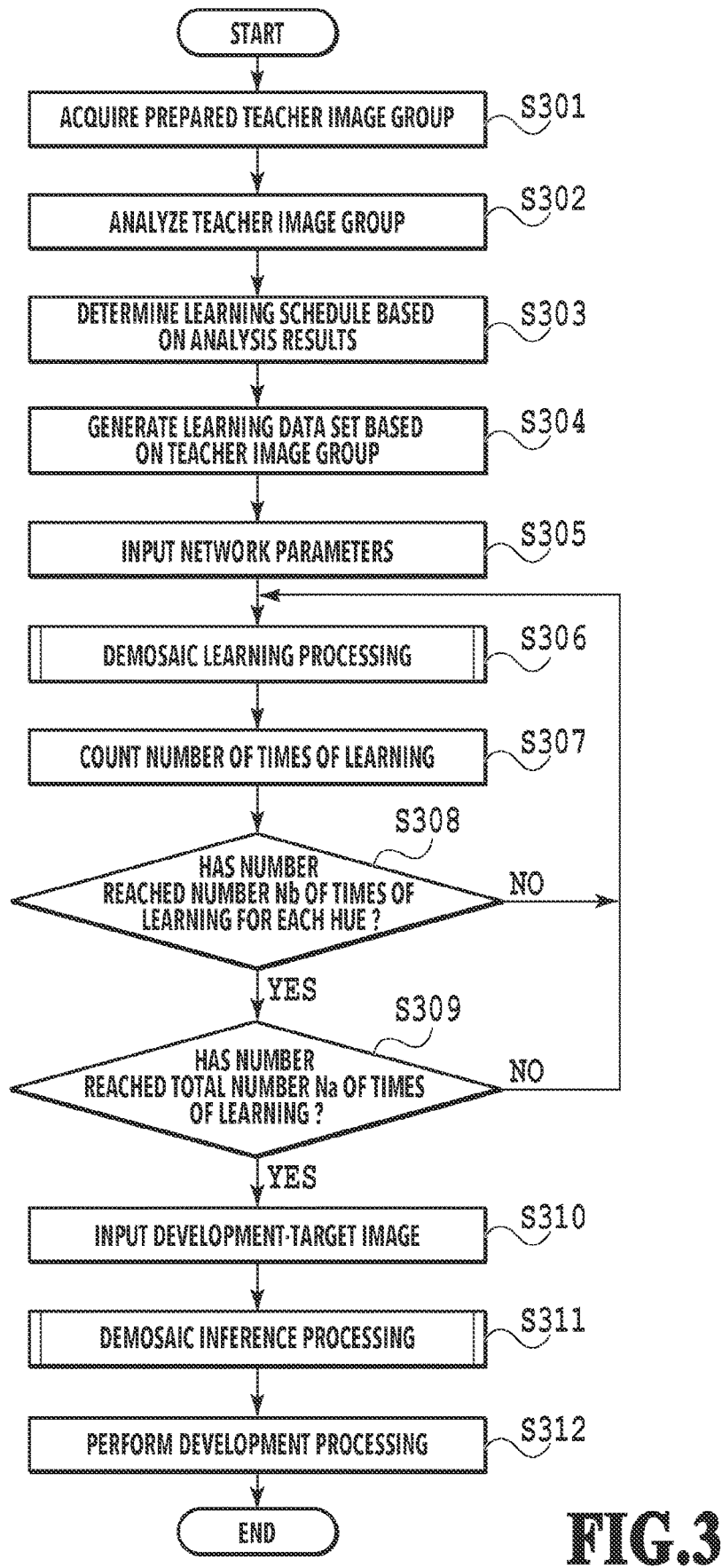
FIG. 3 is a flowchart showing a flow of processing in the information processing system.

Next, various kinds of processing performed in the information processing system of the present embodiment are explained by using the drawings. FIG. 2 is a function block diagram of the entire information processing system and FIG. 3 is a flowchart showing a flow of processing in the information processing system. As shown in FIG. 2, the client PC 100 has a demosaic inference unit 111 and a development unit 112. Further, the cloud server 200 has an analysis unit 211, a learning schedule determination unit 212, a data set generation unit 213, and a demosaic learning unit 214. Each function unit shown in FIG. 2 is implemented by the CPU 101/201 executing the computer program corresponding to each function unit. Note that all or part of the function units shown in FIG. 2 may be implemented by hardware. It is possible to appropriately modify and change the configuration shown in FIG. 2. For example, it may also be possible to divide one function unit into a plurality of function units for each function, or integrate two or more function units into one function unit. In the laming, explanation is given along the flow in FIG. 3. In the hollowing explanation, symbol "S" means a step.

At S301, data of a teacher image group prepared in advance is input to the cloud server 200. The teacher image is an image including three channels of RGB and obtained by, for example, performing image capturing with the digital camera 10. Generally, the teacher image corresponds to a variety of kinds of captured image, that is, nature photos such as landscapes and animals, human photos such as portraits and sports scenes, artificial object photos such as buildings and products, and the like. Further, it may also be possible to upload a photo as it is, which is obtained by performing image capturing with the digital camera 10, or it may also be possible to store in advance a captured photo in an HDD or the like and upload the stored photo. The data of the teacher image group that is input to the cloud server 200 is sent to the analysis unit 211 and the data set generation unit 213. Further, various parameters used by the analysis unit 211, the learning schedule determination unit 212, the data set generation unit 213, and the demosaic learning unit 214 are input to the cloud server 200.

Figure 4:
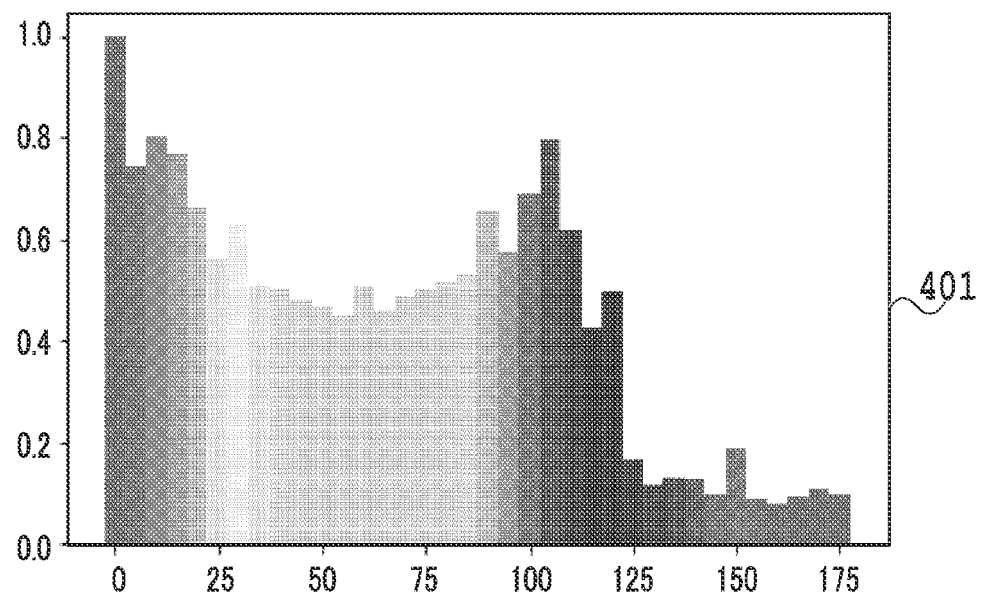
FIG. 4 is a diagram showing an example of analysis processing.

At S302, the analysis unit 211 obtains a hue distribution by analyzing the hue that is the attribute of the color included in the input teacher image group using parameters BIN indicating bins of a histogram, which are acquired at S301. The hue analysis method is explained by using the drawings. FIG. 4 is a diagram showing an example of a hue histogram that is analysis results obtained by the hue analysis by the analysis unit 211. As shown in FIG. 4, a histogram (hue histogram) 401 is a histogram obtained by converting all the teacher images included in the input teacher image group from the RGB color space into the HSV color space and extracting only the values of hue (H). In the hue histogram 401, the horizontal axis represents the position of the hue on the spectrum and the position of the hue is represented by angles from 0 to 180 degrees in which the width of a bin is provided as a section of five degrees. Further, in the hue histogram 401, the vertical axis represents the appearance frequency of each hue by a value normalized to 0 to 1.0. In the hue histogram 401, it is known that the appearance frequency of the hue is relatively low in the range between 125 degrees and 180 degrees compared to that in the other range (between 0 degrees and 125 degrees) and it is relatively high in the range between 0 degrees and 125 degrees compared to that in the other range (between 125 degrees and 180 degrees). That is, it is known that there is a bias in the hue distribution in the hue histogram 401. Information relating to the appearance frequency of the hue such as this is sent to the learning schedule determination unit 212 as the analysis results.

Explanation is returned to FIG. 3. At S303, the learning schedule determination unit 212 determines a learning schedule based on the input analysis results and records it as a learning information file. The learning schedule includes a total number Na of times of learning and a number Nb_x of times of learning for each hue (for each predetermined section). The total number Na of times of learning is the parameter acquired at S301 and set in advance. The total number Na of times of learning represents the number of times the demosaic learning unit 214 performs learning of demosaic using the teacher image group, that is, the total value of the numbers of times of learning. In the learning information file, the total number Na of times of learning, the number and section of the hue, and a number Nb of times of learning of the teacher image belonging to each section of the hue are recorded. In the present embodiment, it is assumed that to which section the teacher image belongs is determined by the hue of the section corresponding to the highest appearance frequency indicating that the appearance frequency is the highest in the hue histogram of the teacher image data and the number Nb of times of learning is calculated from the reciprocal number of the appearance frequency of each hue. The learning schedule determined in the processing by the learning schedule determination unit 212 is explained by using the drawings. FIG. 5 is a diagram showing an example of the learning schedule determined in the processing by the learning schedule determination unit 212. A learning schedule 500 is also called a learning information file. The learning schedule 500 is represented in the form of a table and in order from the left, a total number Na of times of learning 501, a hue number x 502, a section 503 corresponding to the hue number 502, and a number Nb of times of learning 504 for each hue (for each predetermined section) are recorded. In the learning schedule 500, with the hue section 503 in units of five degrees, each of the hue numbers 502 from 1 to 36 is associated. For the hue numbers 502 of 1 to 5, as the number Nb of times of learning 504, one or two is set, and for the hue number 502 of 36, as the number Nb of times of learning 504, ten is set. The number of times learning is performed at least once by using all the teacher image data and the number Nb_x of times of learning for each hue (for each predetermined section) are determined and recorded in the learning information file. Further, x represents the hue number. In the learning schedule thus determined, the number of times of learning with which the hue distribution becomes uniform for each predetermined section in the color attribute is indicated. That is, in the learning schedule, the number of times of learning is indicated with which the distribution characteristic becomes uniform for each predetermined section in the color attribute by setting the number of times of learning relatively small in the section in which the appearance frequency is relatively high and setting the number of times of learning relatively large in the section in which the appearance frequency is relatively low.

Figure 6:
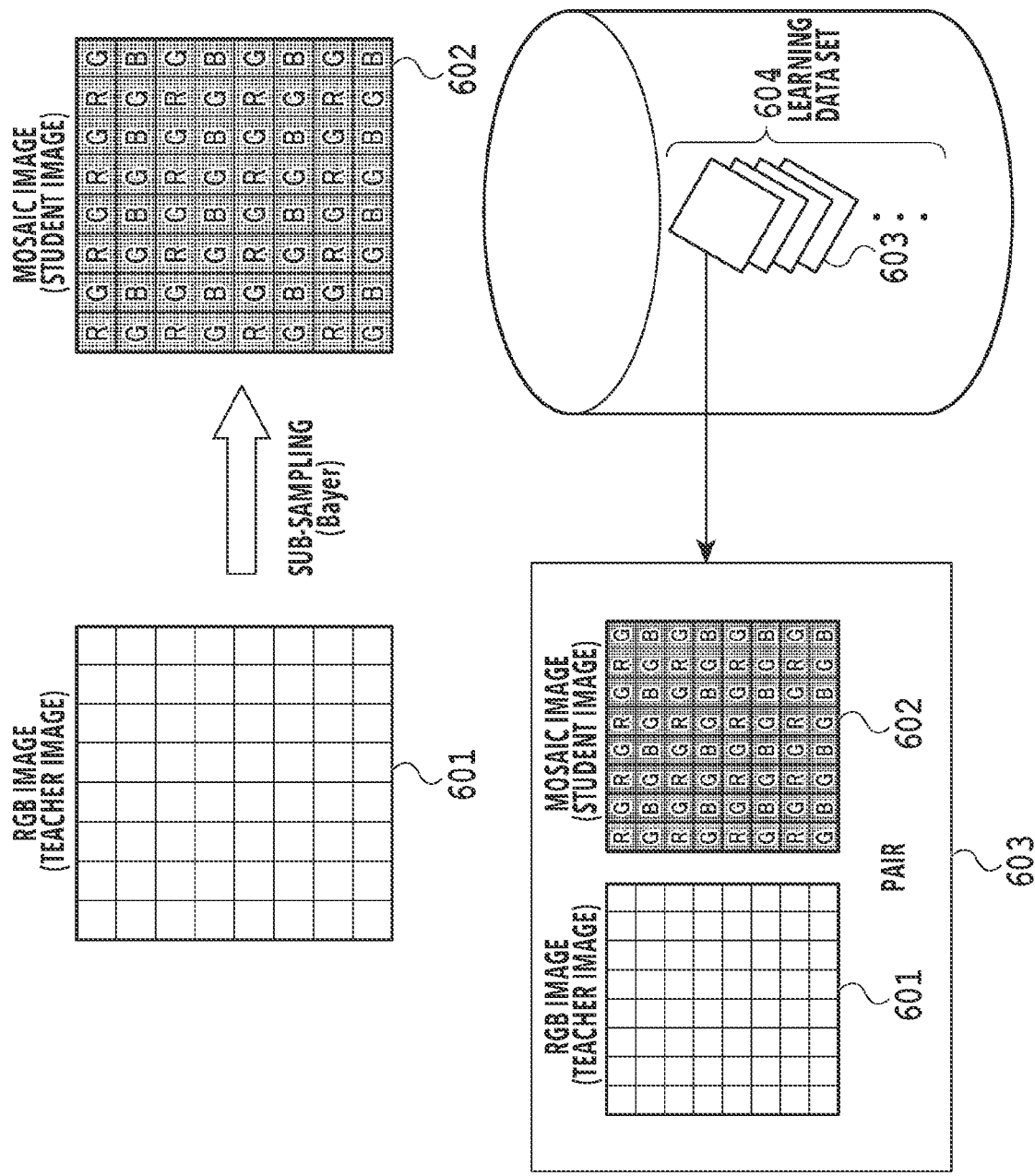
FIG. 6 is a diagram explaining generation of a data set.

Explanation is returned to FIG. 3. At S304, the data set generation unit 213 generates a data set (pair of teacher image and student image) used for learning based on the teacher image group acquired at S301. Here, the data set generation method is explained by using the drawings. FIG. 6 is a diagram explaining an example of the data set generation method. In FIG. 6, a student image 602, which is a mosaic image, is generated by sampling pixels in a teacher image 601 including three channels of RGB in accordance with the Bayer array. Then, a pair 603 that is a set of the RGB image (teacher image) 601 and the mosaic image (student image) 602 corresponding to the RGB image (teacher image) 601 is generated. The pair 603 such as this is generated as many as the number of the teacher images 601. Although the Bayer array is used here as the color filter array, it may also be possible to determine the color filter array in accordance with the image format of the input RAW image and for example, another color filter array, such as X-Trans, may be used. The plurality of the generated pairs 603 is sent to the demosaic learning unit 214 as data set 604. It may also be possible to design a configuration in which the contents of the data set 604, which are generated at S304, are only the data of the teacher image group and the data of the corresponding student image group is generated in the subsequent demosaic learning (in the processing to calculate an error (loss function) between the teacher image and the demosaicked student image).

Explanation is returned to FIG. 3. At S305, the above-described network parameters to be applied to the CNN of the demosaic learning are input to the cloud server 200. The input network parameters are sent to the demosaic learning unit 214.

At S306, the demosaic learning unit 214 learns the CNN by using the data set generated at S304 after initializing the weights of the CNN by using the received network parameters. Details of the demosaic learning will be described later.

At S307, the demosaic learning unit 214 counts the number of times of learning. Here, the total number of times of learning and the number of times of learning of the corresponding hue are counted up.

At S308, the demosaic learning unit 214 determines whether or not the number of times of learning for each hue has reached the number Nb of times of learning 504 for each hue (section) of the learning schedule 500 determined at S303. In a case where the determination results that the number Nb of times of learning 504 has been reached are obtained (YES at S308), the demosaic learning unit 214 moves the processing to S309. In a case where the determination results that the number Nb of times of learning 504 has not been reached are obtained (NO at S308), the &mosaic learning unit 214 returns the processing to S306. More specifically, in a case where there is even one section that has not reached the number Nb of times of learning 504 in the range between 0 degrees and 180 degrees (NO at S308), the demosaic learning unit 214 returns the processing to S306.

At S309, the demosaic learning unit 214 determines whether or not the total number of time of learning has reached the number Na of times of learning 501 that is set in advance. In a case where the learning schedule 500 shown in FIG. 5 is made use of, whether or not the total number Na of times of learning 501 has reached 100 is determined. In a case where the determination results that the total number has reached 100 are obtained (YES at S309), the network parameters as the learning results (trained model) generated by the demosaic learning unit 214 are output. The network parameters as the output learning results (trained model) are sent to the demosaic inference unit 111 of the client PC 100. In a case where the determination results that the total number has not reached 100 are obtained (NO at S309), the demosaic learning unit 214 returns the processing to S306.

At S310, the RAW image that is the development processing target is input to the client PC 100. As regards this RAW image, it may also be possible to directly input, for example, the RAW image captured in advance with the digital camera 10, or read the RAW image captured in advance and stored in the large-capacity storage device 104. Further, the image capturing parameters, such as the ISO sensitivity at the time of capturing the input RAW image, are also input together. The input RAW image data is sent to the demosaic inference unit 111.

At S311, the demosaic inference unit 111 constructs the same CNN as that used in the learning of the demosaic learning unit 214 and performs demosaic of the input RAW image. At this time, the already-existing network parameters are initialized by the updated network parameters received from the cloud server 200. In this manner, by inputting the input RAW image to the CNN to which the updated network parameters have been applied and performing demosaic by the same method as that performed by the demosaic learning unit 214, and thereby, an RGB image (inference results) for which color information has been interpolated is obtained. The RGB image (inference results) is sent to the development unit 112.

At S312, the development unit 112 generates development results by performing predetermined development processing for the RGB image (inference results) obtained at S311. In the predetermined development processing, edge enhancement for increasing emphasis, γ correction to correct lightness, color correction for increasing brightness and the like are included. That is, in the development processing of the present embodiment, processing in general to perform correction so that an output image seems favorable is included. Details of the development processing are not the main purpose of the present embodiment, and therefore, detailed explanation thereof is omitted. The generated development results are output to the outside of the client PC 100. The output destination is not limited to a specific output destination and may be the large-capacity storage device 104 of the client PC 100, the external storage device 30 connected to the client PC 100, and another device connected to the general purpose I/F 105 of the client PC 100.

The above is the general flow of the processing performed in the information processing system of the present embodiment. In the present embodiment, the RAW image data is demosaicked by using the network parameters as the learning results (trained model) output by the cloud server 200. Due to this, it is possible to suppress an error, such as a false pattern, from occurring.

<Demosaic Learning Processing>

Figure 7:
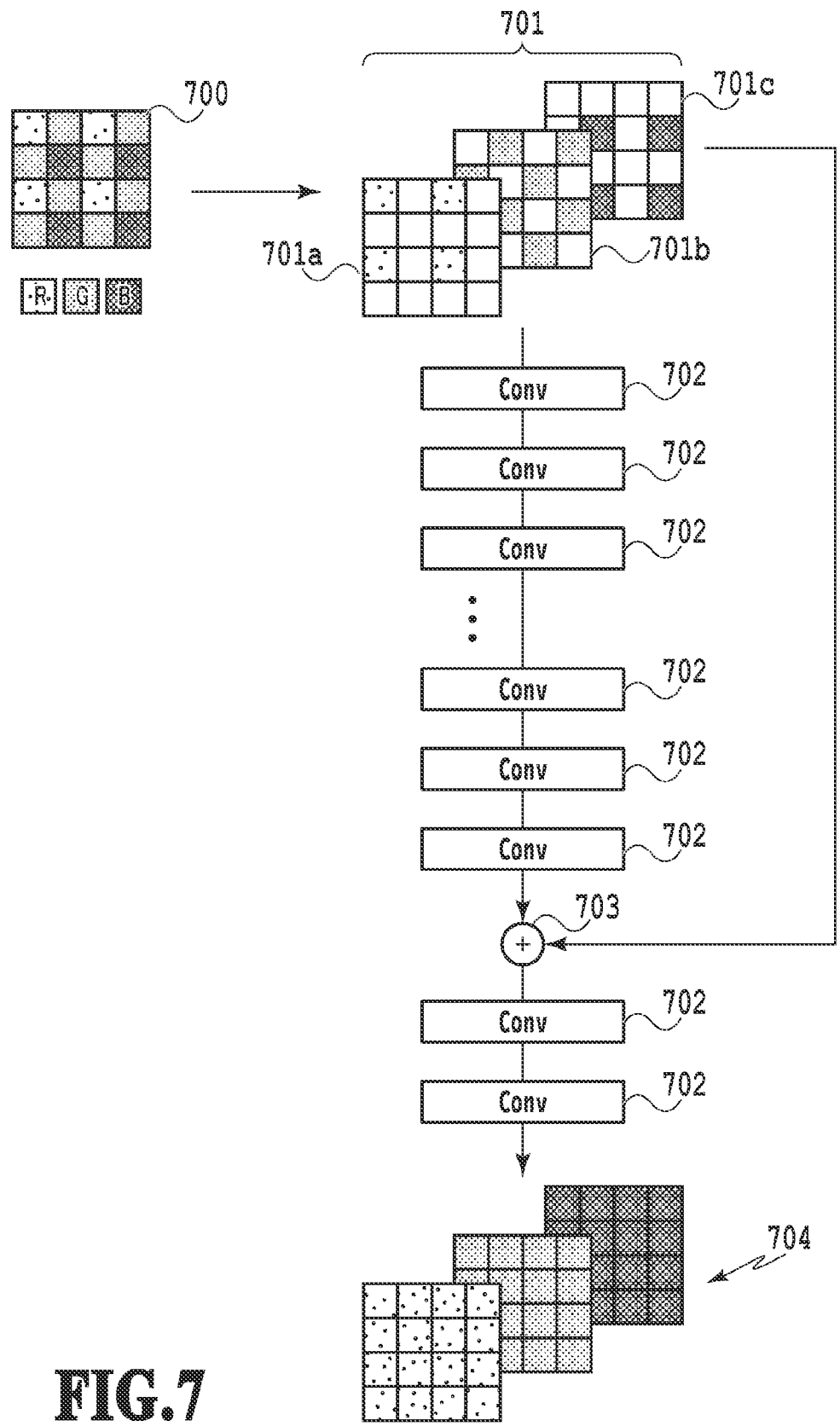
FIG. 7 is a diagram explaining a structure of a CNN and a flow of learning.

Following the above, the demosaic learning in the demosaic learning unit 214 is explained by using the drawings. For the learning, for example, the CNN disclosed by Michael Gharbi is used. FIG. 7 is a diagram explaining the structure of the CNN and the flow of learning.

The CNN includes a plurality of filters 702 performing the operation in formula (1) described previously. To this CNN, a student image 700 included in the pair image described previously is input. At this time, the student image 700 is converted into a defect image 701 of three channels of the student image 700 as shown in FIG. 7 and then input. In an R channel 701a in the defect image 701, only the pixels of the R component of the student image 700 are included and to the other pixels, a defect value (0) is set. This is also the same with the G channel and the B channel. That is, in a G channel 701b, only the pixels of the G component of the student image 700 are included and to the other pixels, the defect value (0) is set. Further, in a B channel 701c, only the pixels of the B component of the student image 700 are included and to the other pixels, the defect value (0) is set. It may also be possible to set the defect value by performing interpolation by a method, such as bilinear interpolation. Next, a feature map is calculated by sequentially applying the filters 702 to the defect image 701. Following this, by a connection layer 703, the calculated feature map and the defect image 701 are connected in the channel direction. In a case where the number of channels of the feature map is n1 and that of the defect image is n2, the number of channels of the connection results is (n1+n2). Following this, the filters 702 are applied to the connection results and three channels of RGB are output from the last filter. Due to this, images including three channels of RGB are obtained as inference results 704. Then, a loss function value is obtained by finding a difference between the obtained inference results 704 and the teacher image (not shown schematically) included in the pair image and calculating the average for the entire image. Then, by using the obtained loss function value, the network parameters are updated by back propagation or the like.

It may also be possible to further perform fine tuning for the CNN after the demosaic learning as described above. The fine tuning is a learning method of fine tuning the weights of the trained model. As a specific method, first, demosaic is performed by using the trained model for the chart image (mosaic image) including combinations of hues whose appearance frequency is low statistically and whether or not a false pattern occurs is inspected. The false pattern refers to a pattern correlated to the color filter array. In the inspection of whether or not a false pattern occurs, first, the difference value between before demosaic and after demosaic is derived for each pixel for the chart image and the derived difference value and a threshold value th (predetermined value) that is set in advance are compared. Then, in a case where the percentage of pixels that satisfy difference value>threshold value th is y (=10) % or higher, that is, in a case where the predetermined condition is not satisfied, the inspection results that a false pattern has occurred are obtained. In a case where the hue whose appearance frequency in the hue histogram is the highest and the hue whose appearance frequency is the second highest are globally in a complementary color (in particular, green/magenta) relationship, the number of times of learning is set larger than the number Nb of times of learning for image data belonging to each hue. Due to this, it is possible to make an attempt to further improve robustness.

In a case where inspection results that a false pattern has occurred in the chart image after the demosaic are obtained, the data set is constructed again with the teacher image having a combination of hues similar to the combination of hues in the chart image being taken as a center and fine tuning is performed for the trained model. Further, it may also be possible to update the number Nb of times of learning of the target hue at the time of performing fine tuning. That is, it may also be possible for the learning schedule determination unit to specify the hue similar to the area in which a false pattern has occurred based on the inspection results that a false pattern has occurred and update the learning information file so that the number Nb of times of learning of the specified hue is 1 and the number Nb of times of learning of hues other than the hue is 0. At this time, the total number Na of times of learning is reduced significantly (for example, Na=5) and the weights of the trained model are updated. Due to this, it is possible to improve the robustness of the trained model. As the chart image, it may also be possible to use one kind of chart image or use a plurality of chart images whose texture is different in order to suppress overlearning.

Modification Example

In the present embodiment, although the hue distribution is analyzed and the learning schedule (number of times of learning for each hue) that eliminates the bias is generated, the present embodiment is not limited to this. That is, it may also be possible to generate a learning schedule (number of times of learning for each saturation or number of times of learning for each luminance) so as to eliminate the bias in each distribution by analyzing another distribution characteristic, such as the saturation distribution and the luminance distribution.

Further, in the present embodiment, although explanation is given by taking demosaic as an example, it is possible to improve the robustness of the deep learning also in another image signal processing system (for example, noise reduction, super resolution and the like) by using the teacher image group generated by this method. It is possible to implement the noise reduction and super resolution, which apply the deep learning, by using the teacher image group generated by this method for the publicly known CNN-based network (REDNET, SRCNN and the like).

As above, according to the present embodiment, in a case where there is a bias in the distribution of three color attributes (hue, saturation, luminance) in the teacher image group, the learning schedule (number of times of learning) is generated so as to eliminate the bias. That is, the learning schedule is determined so that the number of times of learning of the color attribute is relatively large in the section in which the appearance frequency is relatively low, and the number of times of learning of the color attribute is relatively small in the section in which the appearance frequency is relatively high. Due to this, it is possible to perform demosaic learning that suppresses the bias in the color attribute, and therefore, it is possible to obtain a learning model whose robustness is high.

Although the example is explained in which all the teacher images acquired at S301 are used in the analysis processing of the present embodiment, the example is not limited to this. It may also be possible to use only part of all the teacher images acquired at S301.

Further, in the present embodiment, although the example is explained in which the number of times of learning, which makes uniform the hue distribution characteristic, for each predetermined section in the hue based on the hue distribution characteristic obtained by analyzing the hue of the teacher image group, the example is not limited to this. It may also be possible to determine the number of times of learning, which makes uniform the saturation distribution characteristic, for each predetermined section in the saturation based on the saturation distribution characteristic obtained by analyzing the saturation of the teacher image group. Further, it may also be possible to determine the number of times of learning, which makes uniform the luminance distribution characteristic, for each predetermined section in the luminance based on the luminance distribution characteristic obtained by analyzing the luminance of the teacher image group.

Further, although to which section a teacher image belongs is determined by the hue whose appearance frequency is the highest from the hue histogram of the teacher image, the method is not limited to this. For example, it may also be possible to determine the section by the hue whose appearance frequency is the highest of the hue histogram obtained from only the object within the teacher image.

Further, although the number Nb of times of learning for each hue is calculated from the reciprocal number of the appearance frequency of each hue, the calculation method is not limited to this. It may also be possible to calculate the number of times of learning by any method as long as the method is capable of calculating it so that the number of times of learning of the image data belonging to the hue whose appearance frequency is low is relatively large and the number of times of learning of the image data belonging to the hue whose appearance frequency is high is relatively small.

Further, in the present embodiment, although the learning model is generated by performing learning from the beginning using the teacher image group, this is not limited. It may also be possible to perform the demosaic learning of the present embodiment based on the learning model having learned in advance by using a different image group.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present embodiment, it is possible to generate a learning model whose robustness is high in a case where a CNN-based network is learned in an image signal processing system, such as demosaic, noise reduction, and super resolution.

This application claims the benefit of Japanese Patent Application No. 2020-159662, filed Sep. 24, 2020, which is hereby incorporated by reference wherein in its entirety.

What is claimed is:

1. An information processing apparatus that generates a learning model using a network, the information processing apparatus comprising:
 a processor; and
 a memory, including instructions stored thereon, which when executed by the processor, cause the apparatus to:
 acquire a first image group consisting of teacher images comprising plural color components;
 obtain a distribution characteristic representing an attribute of a color included in the first image group;
 generate a data set consisting of a set of the first image group and a second image group corresponding to the first image group;
 determine a number of times of learning based on the distribution characteristic; and
 generate a learning model by performing learning using the network by using the data set based on the number of times of learning, in which the distribution characteristic becomes uniform.

2. The information processing apparatus according to claim 1, wherein
 the distribution characteristic is a hue distribution characteristic indicating a distribution of hue; and
 wherein the instructions when executed by the processor further cause the apparatus to:
 determine the number of times of learning that makes the hue distribution characteristic uniform for each predetermined section in hue based on a hue distribution characteristic obtained.

3. The information processing apparatus according to claim 1, wherein
 the distribution characteristic is a luminance distribution characteristic indicating a distribution of luminance; and
 wherein the instructions when executed by the processor further cause the apparatus to:
 determine the number of times of learning that makes the luminance distribution characteristic uniform for each predetermined section in luminance based on a luminance distribution characteristic obtained.

4. The information processing apparatus according to claim 1, wherein
 the distribution characteristic is a saturation distribution characteristic indicating a distribution of saturation; and
 wherein the instructions when executed by the processor further cause the apparatus to:
 determine the number of times of learning that makes the saturation distribution characteristic uniform for each predetermined section in saturation based on a saturation distribution characteristic obtained.

5. The information processing apparatus according to claim 1, wherein the instructions when executed by the processor further cause the apparatus to:
 generate, in a case where the learning model does not satisfy a predetermined condition, a learning model that satisfies the predetermined condition by integration with another teacher image.

6. The information processing apparatus according to claim 5, wherein
 the predetermined condition is a case where a difference for each pixel between the learning model and another teacher image exceeds a predetermined value.

7. The information processing apparatus according to claim 1, wherein the instructions when executed by the processor further cause the apparatus to:
 set the number of times of learning relatively high for a section in which an appearance frequency is relatively low in the color attribute based on the distribution characteristic.

8. The information processing apparatus according to claim 7, wherein the instructions when executed by the processor further cause the apparatus to:
 set the number of times of learning relatively high for a section consisting of complementary colors globally even in a section in which the appearance frequency is relatively low.

9. The information processing apparatus according to claim 1, wherein the instructions when executed by the processor further cause the apparatus to:
 determine the number of times of learning that makes the distribution characteristic uniform for each predetermined section in the color attribute.

10. The information processing apparatus according to claim 1, wherein
 the network is a network using a convolutional neural network.

11. The information processing apparatus according to claim 1, wherein the instructions when executed by the processor further cause the apparatus to:
 acquire a RAW image, which is a target of development; and
 generate an RGB image including three channels of RGB corresponding to the color components by performing demosaic by inference using the learning model obtained by the learning for the RAW image.

12. An information processing method of generating a learning model using a network, the information processing method comprising:

an acquisition step of acquiring a first image group consisting of teacher images comprising plural color components;

an analysis step of obtaining a distribution characteristic representing an attribute of a color included in the first image group;

a generation step of generating a data set consisting of a set of the first image group and a second image group corresponding to the first image group;

a determination step of determining a number of times of learning based on the distribution characteristic; and a learning step of generating a learning model by performing learning using the network by using the data set based on the number of times of learning, in which the distribution characteristic becomes uniform.

13. A non-transitory computer-readable storage medium storing a program for causing a computer to execute an information processing method of generating a learning model using a network, the information processing method comprising:

acquiring a first image group consisting of teacher images comprising plural color components;

obtaining a distribution characteristic representing an attribute of a color included in the first image group;

generating a data set consisting of a set of the first image group and a second image group corresponding to the first image group;

determining a number of times of learning based on the distribution characteristic; and generating a learning model by performing learning using the network by using the data set based on the number of times of learning, in which the distribution characteristic becomes uniform.

* * * * *